Aug. 9, 1966   L. E. KILNESS   3,265,171
ONE WAY REVERSIBLE CLUTCH FOR WRENCH
Filed June 22, 1964
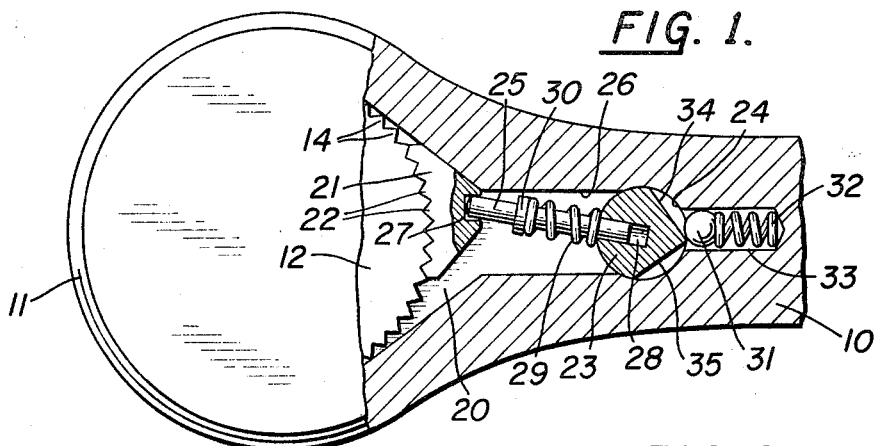
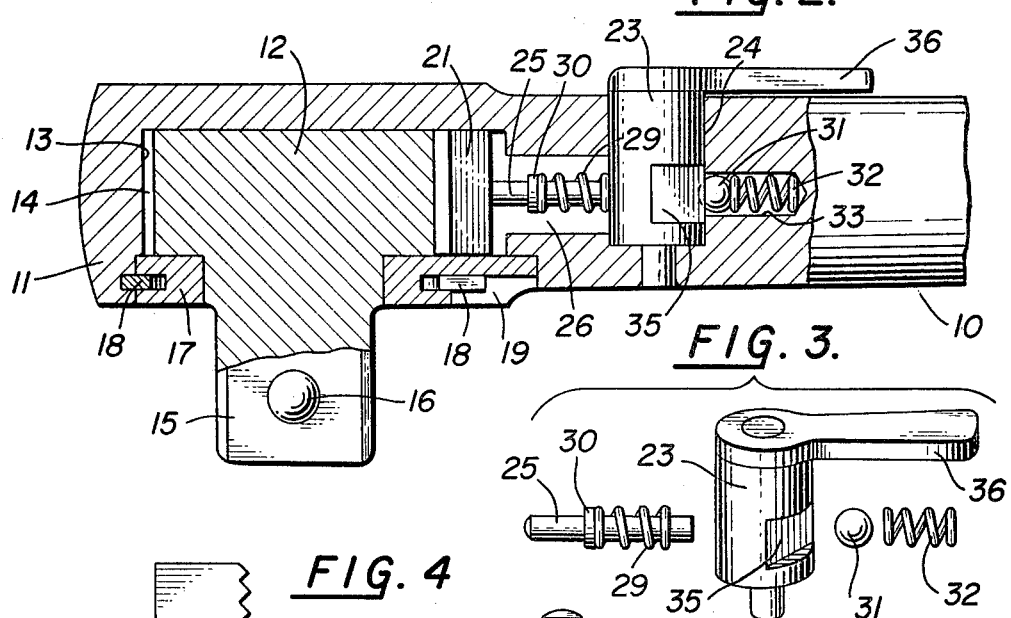
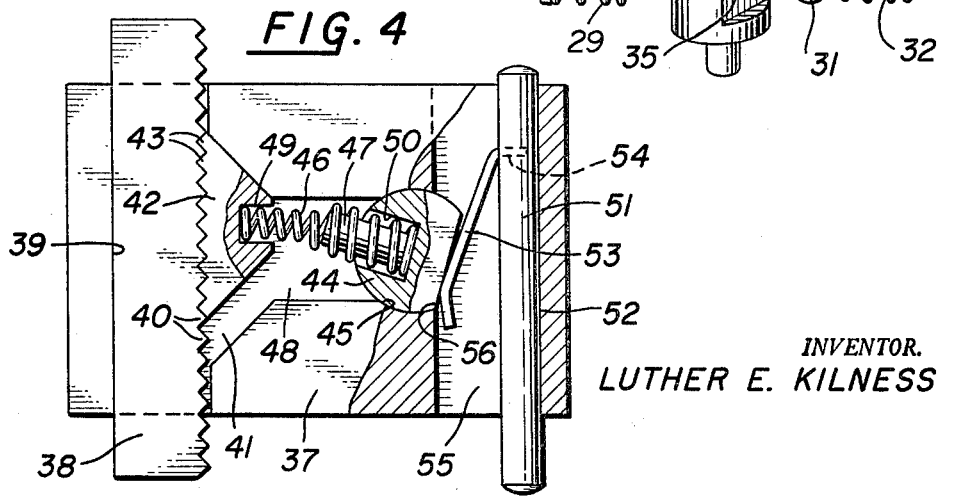
INVENTOR.
LUTHER E. KILNESS

United States Patent Office 3,265,171
Patented August 9, 1966

3,265,171
ONE WAY REVERSIBLE CLUTCH FOR WRENCH
Luther E. Kilness, 211 E. Philadelphia St.,
Rapid City, S. Dak.
Filed June 22, 1964, Ser. No. 377,030
4 Claims. (Cl. 192—43.2)

This invention relates to ratchet mechanisms of the reversible type. This application is a continuation-in-part of application Serial No. 76,341, filed December 16, 1960, now abandoned.

One object of the invention is to improve the pawl controls for reversible pawls of the wedging type having an arcuate or linear toothed surface.

Another object is to provide efficient pawl controls of economical manufacture.

Still another object is the provision of directional manual controls, which may have either a rotary or a translational shift element.

Other objects and advantages of the invention will be apparent from the description and the drawing.

In the drawing:

FIGURE 1 is a partial horizontal section of a ratchet wrench illustrating the invention.

FIGURE 2 is a vertical section of the ratchet wrench shown in FIGURE 1.

FIGURE 3 is a detail view of pawl-shifting elements for the ratchet wrench.

FIGURE 4 is a top view of a modification of the invention showing a linear ratchet mechanism illustrating the invention. Part of the mechanism is shown in section for greater clarity.

In the ratchet wrench shown in FIGURES 1, 2, and 3, a body member 10 has a head 11 at one end. A rotatable member 12 is journaled in a circular opening 13 of the head 11. Ratchet teeth 14 on the rotatable member are closely fitted to the opening to provide the journaling function. A square projection 15 is formed on one end of the rotatable member for holding interchangeable sockets. A ball 16 urged by a spring (not shown) holds the sockets on the projection. A bottom plate 17 maintains the rotatable member 12 in assembly. A conventional retaining ring 18 of the split type fits corresponding grooves in the head and bottom plate to keep the bottom plate in position. The ends of the retaining ring project into a back recess 19 in the head. The ends of the retaining ring may be compressed for removal of the bottom plate and ratcheting parts.

A pawl recess 20 is formed in the head 11. The recess has straight sidewalls forming bearing surfaces. The sidewalls are tangential to the circular opening 13. A wedging-type reversible pawl 21 is carried in the recess. One side of the pawl is formed with an arcuate series of teeth 22 corresponding to the ratchet teeth 14 of the rotatable member. All of the pawl teeth are used for driving for both directions. The arcuate side of the pawl is shorter than the recess dimension along the envelope of the ratchet teeth 14 to permit limited movement of the pawl between the two bearing surfaces of the recess. The pawl has sidewalls extending from the arcuate side which have bearing surfaces matching the bearing surfaces of the recess for transmitting the thrust of the pawl to the body member 10.

A shift member 23 is employed for controlling the pawl. The shift member is positioned in a bore 24 in body member 10. A reduced portion of the shift member is peened over at the bottom for holding the shift member in assembly. A control pin 25 interconnects the shift member and the pawl. The control pin has freedom for angular movement in a connecting chamber 26, which extends from the recess 20 to the bore 24. The pawl has a small, centrally positioned hole 27 loosely receiving one end of the control pin. A hole 28 in the shift member 23 slidable receives the other end of the control pin. A pawl spring 29 acts between the shift member and a shoulder 30 on the control pin to provide a light pressure on the pawl in the general direction of the ratchet teeth 14.

The shift member 23 is maintained in position by a ball 31 resiliently acted on by a spring 32 contained in a hole 33 in body member 10. The ball engages straight faces 34 and 35 on shift member 23. A shift lever 36 is pressed on a small extension on the shift member to provide manual control of the direction of ratchet driving.

In operation, the pawl 21 is shifted laterally to either side of the recess 20 by the control pin 25 for driving in a selected direction. In FIGURE 1 the pawl is shown in position for driving in a clockwise direction. In this position the pawl is urged generally toward the ratchet teeth 14 by the action of the relatively soft spring 29 and is also given a resilient angular bias by the action of spring-pressed ball 31 on face 34 of shift member 23. The angular bias is independent of the resilient action of spring 29 and permits an independent adjustment of all forces acting on the pawl. The radial bias toward the ratchet teeth 14 should preferably be much less than the angular bias and can be separately designed to have any desired low value with the above-described means. With the controls positioned as in FIGURE 1, the pawl will releasably engage successive series of ratchet teeth 14 as the handle is turned counterclockwise for the back stroke. The pawl will be wedged in the position shown in FIGURE 1 for the driving stroke in a clockwise direction. Reversing the pawl action by means of shift lever 36 will bring the pawl against the other bearing surface of the recess 20, and the mechanism will then driven in a counterclockwise direction.

The embodiment of the invention shown in FIGURE 4 is a linear-movement mechanism. A body member 37 and a slidable member 38 are arranged for relative linear movement with respect to each other. The slidable member is received in a channel 39 in the body member. The slidable member is formed with a series of parallel ratchet teeth 40. The body member 37 has a pawl recess 41 on one side of the channel 39. The recess has straight sides forming bearing surfaces, which converge toward each other in a direction away from the channel. A pawl 42 is contained in the recess. The pawl has a linear series of teeth 43 corresponding to the ratchet teeth 40.

A shift member 44 is positioned in a bore 45 in body member 37. A dual-diameter pawl spring 46 connects the shift member and the pawl. A reinforcing pin 47 stiffens the portion of the pawl spring having the large diameter so far as a transverse strain or deflection is concerned. A central channel 48 provides space for movement of the pawl spring as it shifts the pawl. One end of the pawl spring is entered into a hole 49 in the pawl, and a second end is entered into a hole 50 in the shift member 44.

The force component against the ratchet teeth 40 is determined primarily by the enlarged portion of the pawl spring 46. The enlarged portion of the pawl spring has a reduced compressional force, which is preferable for the force acting against the ratchet teeth 40. The variable elasticity of the pawl spring enables better control of the compressional and bending components of the spring. A reinforcing pin, such as pin 47, may be used to increase the transverse stiffness of the pawl spring. In the embodiment shown in FIGURE 1, the transverse component from the pawl spring 29 has been eliminated completely by control pin 25.

A linearly displaceable manual shift element 51 is provided for controlling the direction of ratchet driving. The manual shift element is positioned in a transverse bore 52 in the body member 37 and extends outside of the body member for accessibility. A spring 53 has one end secured in a hole 54 in the manual shift element. The spring occupies a slot 55 in the body member. The free end of the spring engages a flat 56 on the shift member. The action of spring 53 on the flat 56 of shift member 44 tends to rotate the shift member and provides a resilient transverse force on the pawl. The rotational force acting on the shift member 44 depends on the characteristics of the spring 53. For a given pawl spring 46 which is either stiffened against transverse deflection or has sufficient transverse stiffness in itself to resist excessive deflection the transverse or lateral force acting on the pawl depends on the rotation of the shift member 44, which in turn depends on the characteristics of the spring 53. For a given pawl spring, therefore, different characteristics may be assigned to the spring 53 to give different transverse forces on the pawl independently of the exact characteristics of the pawl spring.

In operation, with the manual shift element 51 in the position shown in FIGURE 4, the shift member 44 is urged in a clockwise direction. The pawl spring 46 urges the pawl against the ratchet teeth 40 and against the upper bearing surface of the recess 41. The wedging action of the pawl prevents the slidable member 38 from moving up, but it can move down. To reverse the ratcheting action, the manual shift element 51 is moved up from the position shown in FIGURE 4. The spring 53 then engages the upper portion of flat 56 to rotate the shift member in a counterclockwise direction. The pawl would then be shifted to the bottom bearing surface of recess 41. The wedging action of the pawl would prevent further downward movement of the slidable member, but would not interfere with upward movement.

While preferred embodiments of the invention have been illustrated and described, modifications may be made in various details without departing from the invention as defined in the following claims.

What I claim is:

1. In a ratchet mechanism, the combination of two members adapted to relative motion with respect to each other, one of said members having a series of ratchet teeth, the other of said members having a recess therein positioned opposite said ratchet teeth and intercepting part of said ratchet teeth, said recess having two bearing surfaces inclined toward each other in a direction away from said ratchet teeth, a pawl carried in said recess, said pawl being smaller than the recess to permit transverse movement of said pawl within said recess, said pawl having a toothed side adapted to concurrent engagement with said ratchet teeth, said pawl having two sides with bearing surfaces, each of said last-named sides extending to said toothed side, the bearing surfaces of said pawl being adapted to the bearing surfaces of said recess for transmitting the thrust of the pawl to said other member for the two driving directions, and control means for urging the pawl into reversible ratcheting engagement with said ratchet teeth, said control means including a manual control mounted on said other member, said control means further including a spring having a first end operatively secured to said manual control and a second end engaging said pawl, said manual control being arranged to control the action of the first end of said spring in a manner whereby the second end of said spring engaging the pawl tends to follow the movement of said first end to urge the pawl selectively to either bearing surface of said recess, said spring being so consructed as to have a compressional elasticity varying in magnitude at different sections of the spring between the ends of said spring.

2. A ratchet mechanism according to claim 1, wherein said spring consists of a coil spring of varying diameter.

3. In a ratchet mechanism, the combination of two members adapted to relative motion with respect to each other, one of said members having a series of ratchet teeth, the other of said members having a recess therein positioned opposite said ratchet teeth and intercepting part of said ratchet teeth, said recess having two bearing surfaces inclined toward each other in a direction away from said ratchet teeth, a pawl carried in said recess, said pawl having a toothed side adapted to concurrent engagement with said ratchet teeth, said pawl being smaller than the recess to permit lateral movement of said pawl within said recess, said pawl having two sides with bearing surfaces, the bearing surfaces of said pawl being adapted to the bearing surfaces of said recess for transmitting the thrust of the pawl to said other member for the two driving directions, and control means for urging the pawl into reversible ratcheting engagement with said ratchet teeth, said control means including a rotatable shift element and connecting means acting intermediate said pawl and said rotatable shift element, said rotatable shift element being arranged to act on said connecting means so that movement of said rotatable shift element urges the pawl to a selected bearing surface of the recess, said connecting means comprising a spring and support means for stiffening said spring against transverse deflection, said support means being rotatably secured to said rotatable shift element, said control means including means for maintaining said rotatable shift element toward either of two angular positions so that said connecting means maintains a transverse force on said pawl for retaining said pawl toward a selected bearing surface of said recess.

4. In a ratchet mechanism, the combination of two members adapted to relative motion with respect to each other, one of said members having a series of ratchet teeth, the other of said members having a recess therein positioned opposite said ratchet teeth and intercepting a portion of said ratchet teeth, said recess having two bearing surfaces inclined toward each other in a direction away from said ratchet teeth, a pawl carried in said recess, said pawl having a toothed side adapted to concurrent engagement with said ratchet teeth, said pawl being smaller than the recess to permit lateral movement of said pawl within said recess, said pawl having two bearing surface adapted to the bearing surfaces of said recess for transmitting the thrust of the pawl to said other member for the two directions of driving, and control means for urging the pawl into reversible ratcheting engagement with said ratchet teeth, said control means including a linearly-displaceable manual shift element mounted on said other member and extending to the exterior of the ratchet mechanism for accessibility, said manual shift element having two positions relative to said other member, said control means including a rotary shift element and means connecting said rotary shift element to the pawl, said last-named means being responsive to the angular position of the rotary shift element so that the pawl may be directed to a selected bearing surface of said recess on movement of said rotary shift element, said linearly-displaceable manual shift element being connected to said rotary shift element so that movement of said linearly-displaceable manual shift element to one of said two position angularly displaces said rotary shift element, whereby said pawl may be directed to a selected bearing surface of said recess.

References Cited by the Examiner
UNITED STATES PATENTS

| | | | |
|---|---|---|---|
| 893,097 | 7/1908 | Reams | 81—61 |
| 2,957,377 | 10/1960 | Hare | 192—43.2 |
| 3,019,682 | 2/1962 | Hare | 192—43 X |
| 3,044,591 | 7/1962 | Kilness | 192—43.1 |

FOREIGN PATENTS 1,005,095  12/1951  France.

References Cited by the Applicant
UNITED STATES PATENTS

| | | |
|---|---|---|
| 966,597 | 8/1910 | Reams. |
| 2,554,990 | 5/1951 | Kilness. |
| 2,981,389 | 4/1961 | Killness. |
| 3,078,973 | 2/1963 | Kilness. |

DAVID J. WILLIAMOWSKY, *Primary Examiner.*